United States Patent
Kang et al.

(10) Patent No.: US 10,830,942 B2
(45) Date of Patent: Nov. 10, 2020

(54) OPTICAL FIBER WITH REDUCING LIGHT BIAS FOR LIGHTING AND MANUFACTURING METHOD OF THE SAME

(71) Applicants: Hyundai Motor Company, Seoul (KR); KIA Motors Corporation, Seoul (KR); CINOS.CO., LTD, Gyeonggi-do (KR)

(72) Inventors: Chan Hee Kang, Gyeonggi-do (KR); Jin Taek Hwang, Gyeonggi-do (KR); Byeok Jae Lee, Chungcheongnam-do (KR)

(73) Assignees: HYUNDAI MOTOR COMPANY, Seoul (KR); KIA MOTORS CORPORATION, Seoul (KR); CINOS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/213,065

(22) Filed: Dec. 7, 2018

(65) Prior Publication Data

US 2020/0073049 A1    Mar. 5, 2020

(30) Foreign Application Priority Data

Sep. 3, 2018    (KR) .................... 10-2018-0104548

(51) Int. Cl.
| | |
|---|---|
| G02B 6/02 | (2006.01) |
| G02B 6/036 | (2006.01) |
| C07F 9/6574 | (2006.01) |
| B29D 11/00 | (2006.01) |
| B29K 33/00 | (2006.01) |

(52) U.S. Cl.
CPC .... *G02B 6/02033* (2013.01); *B29D 11/00663* (2013.01); *C07F 9/6574* (2013.01); *G02B 6/03633* (2013.01); *B29K 2033/12* (2013.01)

(58) Field of Classification Search
CPC ............ G02B 6/02033; G02B 6/03633; G29D 11/00663; C07F 9/6574; B29K 2033/12
See application file for complete search history.

(56) References Cited

U.S. PATENT DOCUMENTS

| | | | | | |
|---|---|---|---|---|---|
| 3,287,210 | A | * | 11/1966 | Leebrick | ................... C07F 9/90 514/187 |
| 3,530,158 | A | * | 9/1970 | Remes | ...................... C07F 9/90 556/71 |

(Continued)

FOREIGN PATENT DOCUMENTS

| | | | | |
|---|---|---|---|---|
| EP | 0635512 B1 | * | 3/2000 | .......... C07F 9/65746 |
| JP | 2002202415 A | | 7/2002 | |

(Continued)

OTHER PUBLICATIONS

Logunov et al, Light diffusing optical fiber for Illumination, DT3E4.pdf, Renewable Energy and the Environment Congress, 2013 (Year: 2013).*

*Primary Examiner* — Peter Radkowski
(74) *Attorney, Agent, or Firm* — Brinks Gilson & Lione

(57) ABSTRACT

Disclosed is an optical fiber with reducing light bias for lighting including: a core extending in a length direction and formed of a material containing a phosphorus (P) based stabilizer; and a clad formed to surround the core, wherein the phosphorus (P) based stabilizer contains cyclic phosphite.

7 Claims, 1 Drawing Sheet

(56) References Cited

U.S. PATENT DOCUMENTS

Figure 1:
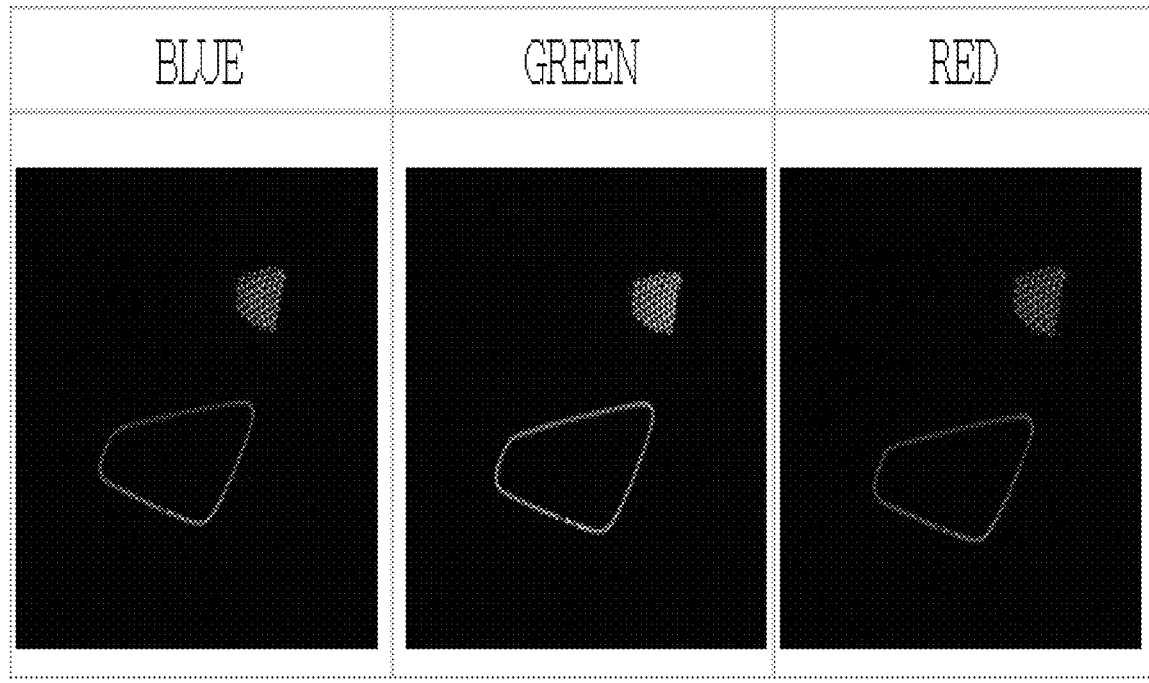

| | | | | |
|---|---|---|---|---|
| 3,558,783 | A * | 1/1971 | Leebrick | A01N 55/02 514/503 |
| 5,827,584 | A * | 10/1998 | Akao | C08L 53/00 428/35.7 |
| 6,217,687 | B1 * | 4/2001 | Shibata | C08J 7/04 156/229 |
| 6,306,494 | B1 * | 10/2001 | Takahashi | C01B 33/26 423/306 |
| 6,418,661 | B1 * | 7/2002 | Takahashi | A01G 9/1438 47/9 |
| 6,501,890 | B1 | 12/2002 | Wilson et al. | |
| 7,862,884 | B2 * | 1/2011 | Iwasa | G03G 7/0013 428/195.1 |
| 9,168,208 | B2 * | 10/2015 | Matsushita | A61K 8/27 |
| 9,624,353 | B2 * | 4/2017 | Tsuda | C09D 5/027 |
| 9,851,500 | B2 * | 12/2017 | Logunov | B60R 11/04 |
| 9,857,515 | B2 * | 1/2018 | Tyagi | G02B 6/0003 |
| 10,353,143 | B2 * | 7/2019 | Logunov | B60R 11/04 |
| 2006/0014004 | A1 * | 1/2006 | Iwasa | G03G 7/0013 428/195.1 |
| 2011/0188261 | A1 * | 8/2011 | Deng | B29D 11/00663 362/551 |
| 2011/0220169 | A1 * | 9/2011 | Okawara | B32B 27/36 136/244 |
| 2011/0223419 | A1 * | 9/2011 | Okawara | B32B 27/36 428/355 EN |
| 2014/0017288 | A1 * | 1/2014 | Matsushita | A61K 8/27 424/401 |
| 2014/0114003 | A1 * | 4/2014 | Yoshimoto | G02B 13/0005 524/396 |
| 2015/0329701 | A1 * | 11/2015 | Tsuda | C09D 5/027 524/376 |
| 2016/0025916 | A1 * | 1/2016 | Tyagi | G02B 6/001 362/583 |

FOREIGN PATENT DOCUMENTS

| | | |
|---|---|---|
| KR | 1020090084729 | 8/2009 |
| KR | 1020110009694 | 1/2011 |
| KR | 1020160045234 | 4/2016 |

* cited by examiner

OPTICAL FIBER WITH REDUCING LIGHT BIAS FOR LIGHTING AND MANUFACTURING METHOD OF THE SAME

CROSS-REFERENCE TO RELATED APPLICATION

This application claims priority to and the benefit of Korean Patent Application No. 10-2018-0104548, filed on Sep. 3, 2018, the entire contents of which are incorporated herein by reference.

FIELD

The present disclosure relates to an optical fiber with reducing light bias for lighting and a manufacturing method of the same.

BACKGROUND

In a conventional method of increasing side light emitting luminance of a omni-directional side light emitting type plastic optical fiber, a method of adjusting the side light emitting luminance and a decay rate of the side light emitting luminance by adding a light dispersant and a small quantity of metal oxide material to a clad may be used.

However, as described above, in a case in which the light dispersant and the small quantity of metal oxide material are added to the clad, a separate of a layer may occur at an interface between the core and the clad due to deterioration, impact, or the like, and a light scattering is reduced in the separated region, which hinders optical characteristics due to a HAZE phenomenon.

The above information disclosed in this section is only for enhancement of understanding of the background of the disclosure and therefore it may contain information that does not form the prior art that is already known in this country to a person in the art.

SUMMARY

The present disclosure describes an optical fiber with reducing light bias for lighting and a manufacturing method of the same, which may inhibit a transmittance reduction phenomenon due, in one form, to degradation by adding cyclic phosphite to a core.

In one aspect, the present disclosure describes an optical fiber with reducing light bias for lighting including: a core extending in a length direction and formed of a material containing a phosphorus (P) based stabilizer; and a clad formed to surround the core, wherein the phosphorus (P) based stabilizer contains cyclic phosphite.

The cyclic phosphite may contain bis(2.6-di-tert-butyl-4-methylphenyl) pentaerythriol-di-phosphite.

The core may be formed of a material containing 0.1 to 0.4 wt % of a silicone dispersant, 0.05 to 1 wt % of the phosphorus (P) based stabilizer, and the remainder resin.

The clad may be formed of a material containing a fluorine (B) based resin.

The clad may be formed of a material that does not contain a silicon dispersant.

The resin may be formed of poly methyl methacrylate (PMMA).

The resin may be a form in which methyl methacrylate and butyl metacrylate are polymerized.

The cyclic phosphate may have a molecular weight of 650 or less.

The cyclic phosphate may have a melting point of 220° C. or more.

The clad may include a first clad layer surrounding the core and having a refractive index lower than that of the core; and a second clad layer surrounding the first clad layer and having a refractive index lower than that of the first clad layer.

Another aspect of the present disclosure provides a manufacturing method of an optical fiber with reducing light bias for lighting, including: preparing a first resin material forming a core and a second resin material forming a clad; and manufacturing the optical fiber in a form that the clad surrounds the core by coextruding the first resin material and the second resin material, a phosphorus (P) based stabilizer, which is cyclic phosphite, is added to the first resin material.

In the preparing of the first resin material and the second resin material, the first resin material may contain 0.1 to 0.4 wt % of a silicone dispersant, 0.05 to 1 wt % of the phosphorus (P) based stabilizer, and the remainder acrylic resin.

The phosphorus (P) based stabilizer may contain bis(2.6-di-tert-butyl-4-methylphenyl) pentaerythriol-di-phosphite.

In the preparing of the first resin material and the second resin material, the second resin material may contain a fluorine (B) based resin.

The second resin material may not contain a silicon dispersant.

According to an aspect of the present disclosure, the optical fiber with reducing light bias may inhibit the transmittance reduction phenomenon by the deterioration by adding the cyclic phosphite to the core.

Further areas of applicability will become apparent from the description provided herein. It should be understood that the description and specific examples are intended for purposes of illustration only and are not intended to limit the scope of the present disclosure.

DRAWINGS

Figure 2:
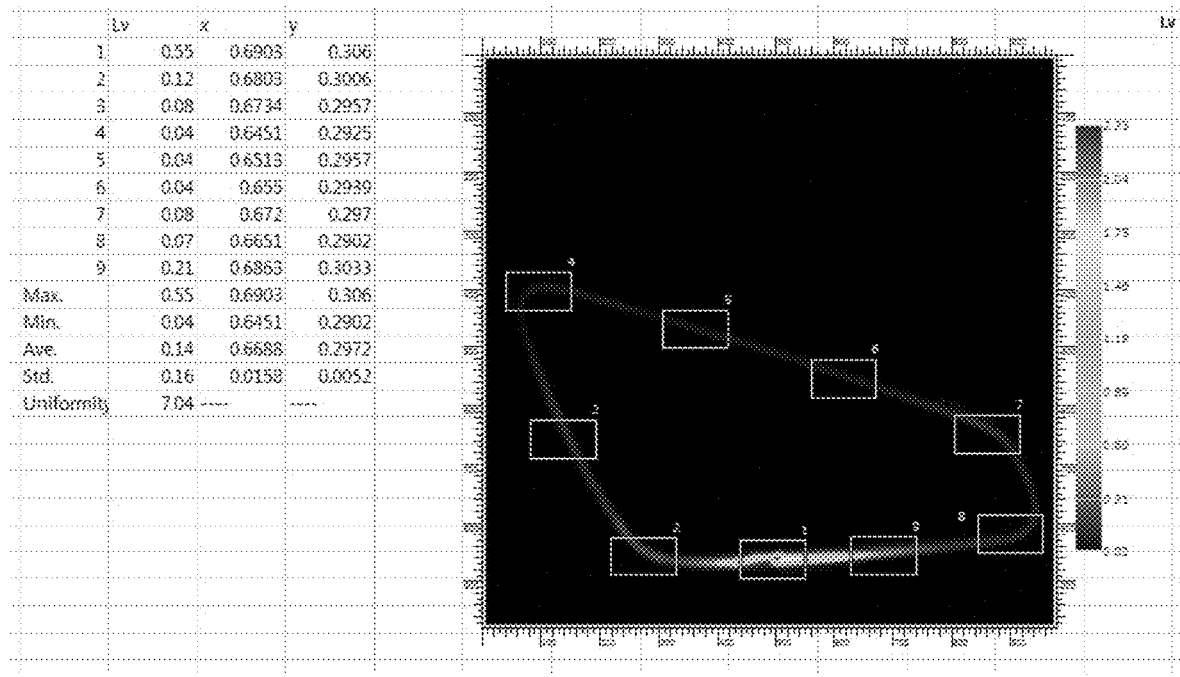

In order that the disclosure may be well understood, there will now be described various forms thereof, given by way of example, reference being made to the accompanying drawings, in which:

FIG. 1 is a drawing illustrating an optical fiber with reducing light bias for lighting; and FIG. 2 is a drawing illustrating an optical fiber with reducing light bias for lighting.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Terms such as first, second, third, and the like are used to describe various portions, components, regions, layers and/or sections, but are not limited thereto. These terms are used only to distinguish any portion, component, region, layer, or section from another portion, component, region, layer, or section. Therefore, a first portion, component, region, layer, or section described below may be referred to as a second portion, component, region, layer, or section without departing from the scope of the present disclosure.

Terminologies used herein merely refer to certain examples and are not intended to limit the present disclosure. Singular forms used herein are intended to include plural forms unless explicitly indicated otherwise. The term "comprises" used in this specification, specifies stated features, regions, integers, steps, operations, elements, and/or components, but does not preclude the presence or addition of other features, regions, integers, steps, operations, elements, and/or components.

When a portion is referred to as being "above" or "on" another portion, it means that a portion may be directly above or on another portion, or other portion may be interposed between a portion and another portion. In contrast, when a portion refers to being "directly above" another portion, no other portion is interposed therebetween.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, aspects of the present disclosure will be described in detail so that those skilled in the art may easily practice the present disclosure. As those skilled in the art would realize, the described aspects may be modified in various different ways, all without departing from the spirit or scope of the present disclosure.

As described above, both ends of a coextruded optical fiber with reducing light bias for lighting are connected to each other so as to be manufactured in a closed curve form.

Optical Fiber with Reducing Light Bias for Lighting

An optical fiber with reducing light bias for lighting according to an aspect of the present disclosure includes a core extending in a length direction and formed of a material containing a phosphorus (P) based stabilizer, and a clad formed to surround the core, wherein the phosphorus (P) based stabilizer contains a cyclic phosphite.

The core may be formed of a material containing 0.1 to 0.4 wt % of a silicone dispersant, 0.05 to 1 wt % of the phosphorus (P) based stabilizer, and the remainder resin.

In order for the resin to have flexibility as a soft segment, a polymerized form of methyl methacrylate and butyl methacrylate may be used. In addition, the resin may be a raw material polymerized with an acrylic rubber or an aliphatic TPU. A core shell is not used. This is because the use of the core shell may have flexibility, but the core shell may hinder optical characteristics by the HAZE phenomenon due to a difference in refractive index with the resin.

In this case, since the resin is excellent in an adhesive force and has a high polarity, the adhesive force with the clad may be improved.

In the case of hard segment, the resin is formed of poly methyl methacrylate (PMMA).

The cyclic phosphite may include bis(2.6-di-tert-butyl-4-methylphenyl) pentaerythriol-di-phosphite.

The cyclic phosphite may have a molecular weight of 650 or less and a melting point of 220° C. or more.

Since the cyclic phosphite has a high molecular weight and a high melting point, the cyclic phosphate may be used at high temperature as the cyclic phosphite is added to the resin, and may serve to reduce thermal deterioration. Accordingly, it is possible to prevent or inhibit a reduction in transmittance due to deterioration.

0.05 to 1 wt % of cyclic phosphite may be added based on the total weight of the core. By satisfying the above-described range of addition, it is possible to prevent or inhibit the HAZE phenomenon due to heat.

Meanwhile, in the case of a product using a side light of a straight line, 0.05 to 1 wt % of a silicon dispersant may be added in order to enhance a side light emitting effect. Accordingly, side light emission may be caused in the core itself.

The clad has a form that surrounds the core and a refractive index thereof should be lower than the refractive index of the core. The clad may be formed of a material containing a fluorine (B) based resin. Specifically, the clad may be formed of a material containing a fluorine (B) based resin having a vinyl group. In addition, the clad may be formed of a material that does not contain the silicon dispersant. Instead, as described above, the resin constituting the core is injected with the silicone dispersant to instead cause the side light emission from the core.

This is for the purpose of making the clad as transparent as possible by using a transparent fluorine (B) based resin and not adding the silicon dispersant. Since the adhesive force with the core using an acrylic resin is excellent by forming the clad with the material containing the fluorine (B) based resin, the optical fiber may be manufactured by a coextrusion method.

This is because the adhesive force between the core and the clad is excellent even by thermal shock, and no peeling occurs.

In the optical fiber with reducing light bias for lighting according to an aspect of the present disclosure, the clad may include two or more layers. Specifically, the clad may include a first clad layer surrounding the core and having a reflective index lower than that of the core, and a second clad layer surrounding the first clad layer and having a refractive index lower than that of the first clad layer.

The first clad layer and the second clad layer may be made of polyvinylidene fluoride (PVDF), which is a fluorine-based resin. However, it is desirable the refractive index of the first clad layer be lower than that of the first clad layer so that the first clad layer and the second clad layer are used as the optical fiber with reducing light bias.

For example, in a case in which the refractive index of the second clad layer is 1.4, the reflective index of the first clad layer may be 1.41 that exceeds 1.4.

Manufacturing Method of Optical Fiber with Reducing Light Bias for Lighting

A manufacturing method of an optical fiber with reducing light bias for lighting according to an aspect of the present disclosure includes preparing a first resin material forming a core and a second resin material forming a clad; and manufacturing the optical fiber in a form in which the clad surrounds the core by coextruding the first resin material and the second resin material, wherein a phosphorus (P) based stabilizer, which is cyclic phosphate, is added to the first resin material.

The first resin material is used to manufacture the core. Specifically, the first resin material may contain 0.1 to 0.4 wt % of a silicone dispersant, 0.05 to 1 wt % of the phosphorus (P) based stabilizer, and the remainder acrylic based resin.

The cyclic phosphite may include bis(2.6-di-tert-butyl-4-methylphenyl) pentaerythriol-di-phosphite.

The second resin material is used to manufacture the clad. Specifically, the second resin material may contain a fluorine (B) based resin and may not contain a silicone dispersant.

Since the description of the first resin material forming the core and the second resin material forming the clad are the same as that in the optical fiber with reducing light bias for lighting, it is replaced with the description described above.

In the case in which the first resin material and the second resin material as described above are prepared, the optical fiber may be manufactured in the form in which the clad surrounds the core by coextruding the first resin material and the second resin material.

As described above, since the optical fiber is manufactured through the coextrusion method, the optical fiber may have flexibility, and since a separate process for polymerization is not required after the extrusion, productivity may be improved.

1. Performance of Optical Fiber with Reducing Light Bias for Lighting Depending on Type of Phosphorus (P) Based Stabilizer Manufacturing of Optical Fiber with Reducing Light Bias for Lighting EXAMPLE 1: A core and a clad were simultaneously extruded using a coextrusion method. In the case of the core, a resin in which phosphorus (P) based stabilizer is dry-blended in the resin was used. The resin is a monomer, and the resin in which methyl methacrylate and butyl methacrylate are polymerized was used.

As the phosphorus (P) based stabilizer, bis(2.6-di-tert-butyl-4-methylphenyl) pentaerythriol-di-phosphite, which is cyclic phosphate, was used. A molecular weight of the cyclic phosphate was 633, and a melting point thereof was 230 to 240° C.

The phosphorus (P) based stabilizer was added in an amount of 0.1 wt % based on the total weight of the core.

In the case of the clad, a material containing a fluorine (B) based resin was used.

EXAMPLE 2: The optical fiber was manufactured in the same manner as in Example 1, except that the phosphorus (P) based stabilizer was added to the resin prepared for manufacturing the core by 0.2 wt % based on the total weight of the core.

Comparative Example 1: The optical fiber was manufactured in the same manner as in Example 1, except that no additional phosphorus (P) based stabilizer was added to the resin prepared for manufacturing the core.

Comparative Example 2: The optical fiber was manufactured in the same manner as in Example 1, except that tris(2.4-di-t-butylphenyl)-phosphite, which is liner phosphite, was used as the phosphorus (P) based stabilizer in the resin prepared for manufacturing the core. A molecular weight of the liner phosphite was 674, and a melting point thereof was 180 to 190° C. The phosphorus (P) based stabilizer was added in an amount of 0.1 wt % based on the total weight of the core.

EXAMPLE 3: The optical fiber was manufactured in the same manner as in Example 2, except that the phosphorus (P) based stabilizer was added to the resin prepared for manufacturing the core by 0.2 wt % based on the total weight of the core.

Performance Evaluation Through Measurement of Yellow Index (YI)

Values obtained by measuring the yellow index (YI) of the optical fiber with reducing light bias for lighting according to the Examples above and the comparative examples are shown in Table 1 below.

TABLE 1

| | Type of Phosphorus (P) Based Stabilizer | Content of Phosphorus (P) Based Stabilizer | Yellow Index (YI) |
|---|---|---|---|
| Example 1 | Cyclic Phosphite | 0.1 wt % | 0.51 |
| Example 2 | Cyclic Phosphite | 0.2 wt % | 0.51 |

TABLE 1-continued

| | Type of Phosphorus (P) Based Stabilizer | Content of Phosphorus (P) Based Stabilizer | Yellow Index (YI) |
|---|---|---|---|
| Comparative Example 1 | — | — | 22 |
| Comparative Example 2 | Liner Phosphite | 0.1 wt % | 11 |
| Comparative Example 3 | Liner Phosphite | 0.2 wt % | 10 |

As may be seen from the above Table 1, it may be seen that the yellow index of the Examples is much lower than that of the comparative examples. It may be seen that thermal degradation may be reduced by using bis(2.6-di-tert-butyl-4-methylphenyl) pentaerythriol-di-phosphite, which is cyclic phosphate, as the phosphorus (P) based stabilizer.

2. Performance of Optical Fiber with Reducing Light Bias for Lighting Depending on Whether or Not Silicon Dispersant is Added During Manufacturing of Clad Manufacturing of Optical Fiber with Reducing Light Bias for Lighting EXAMPLE 1-1: A core and a clad were simultaneously extruded using a coextrusion method. In the case of the core, a resin in which phosphorus (P) based stabilizer is dry-blended in the resin was used. The resin is a monomer, and the resin in which methyl methacrylate and butyl methacrylate are polymerized was used.

As the phosphorus (P) based stabilizer, bis(2.6-di-tert-butyl-4-methylphenyl) pentaerythriol-di-phosphite, which is a cyclic phosphate, was used. A molecular weight of the cyclic phosphate was 633, and a melting point thereof was 230 to 240° C.

The phosphorus (P) based stabilizer was added in an amount of 0.1 wt % based on the total weight of the core.

In the case of the clad, a material containing a fluorine (B) based resin was used.

As described above, both ends of a coextruded optical fiber with reducing light bias for lighting are connected to each other so as to be manufactured in a closed curve form.

EXAMPLE 1-2: The optical fiber was manufactured in the same manner as in Example 1-1, except that the silicon dispersant was added to the resin prepared for manufacturing the core by 0.0001 wt % based on the total weight of the core.

EXAMPLE 1-3: The optical fiber was manufactured in the same manner as in Example 1-1, except that zinc oxide (ZnO) was added to a fluorine (B) based resin prepared for manufacturing the clad by 0.5 wt % based on the total weight of the clad and the silicon dispersant was added thereto by 0.5 wt %.

EXAMPLE 1-4: The optical fiber was manufactured in the same manner as in Example 1-2, except that zinc oxide (ZnO) was added to the fluorine (B) based resin prepared for manufacturing the clad by 0.5 wt % based on the total weight of the clad and the silicon dispersant was added thereto by 0.5 wt %.

Evaluation of Light Bias Degree: A light bias degree was evaluated by measuring luminous intensity at eight arbitrary points on the optical fiber with reducing light bias for lighting forming a closed curve. A sample was mounted on a door trim and evaluated, and 0.2 W was used for a LED light source. RED was used as a light source color.

The measured values are shown in Table 2 below.

TABLE 2

| | Point 1 | Point 2 | Point 3 | Point 4 | Point 5 | Point 6 | Point 7 | Point 8 |
|---|---|---|---|---|---|---|---|---|
| Example 1-1 | 0.49cd | 0.08cd | 0.02cd | 0.01cd | 0.01cd | 0.02cd | 0.02cd | 0.02cd |
| Example 1-2 | 0.55cd | 0.12cd | 0.08cd | 0.04cd | 0.04cd | 0.04cd | 0.08cd | 0.07cd |
| Example 1-3 | 0.48cd | 0.12cd | 0.06cd | 0.11cd | 0.06cd | 0.05cd | 0.09cd | 0.12cd |
| Example 1-4 | 0.49cd | 0.11cd | 0.06cd | 0.13cd | 0.05cd | 0.04cd | 0.1cd | 0.14cd |

In Table 2, cd (candela) is a unit of luminous intensity.

As may be seen from Table 2 and FIG. 2, it may be seen that a deviation in the luminous intensity is not large in Examples 1-3 and 1-4 in which the silicon dispersant is added to the clad, and in Examples 1-1 and 1-2 in which the silicon dispersant is not added to the clad.

The present disclosure is not limited to the above examples, but may be formed in various forms, and it will be understood by those skilled in the art that various changes in form and details may be made therein without departing from the spirit and scope of the disclosure. It is therefore to be understood that the disclosure is illustrative in all aspects and not restrictive.

What is claimed is:

1. An optical fiber with reducing light bias for lighting comprising:
    a core extending in a length direction and formed of a material containing a phosphorus (P) based stabilizer; and
    a clad formed to surround the core,
    wherein the phosphorus (P) based stabilizer contains cyclic phosphite,
    wherein the core is formed of a material containing 0.1 to 0.4 wt % of a silicone dispersant, 0.1 to 0.2 wt % of the phosphorus (P) based stabilizer, and the remainder resin,
    wherein the clad is formed of a material containing a fluorine (F) based resin,
    wherein the clad is formed of a material that does not contain a silicon dispersant.

2. The optical fiber with reducing light bias for lighting of claim 1, wherein:
    the cyclic phosphite contains bis(2.6-di-tert-butyl-4-methylphenyl) pentaerythriol-di-phosphite.

3. The optical fiber with reducing light bias for lighting of claim 1, wherein:
    the resin is formed of poly methyl methacrylate (PMMA).

4. The optical fiber with reducing light bias for lighting of claim 1, wherein:
    the resin is a form in which methyl methacrylate and butyl metacrylate are polymerized.

5. The optical fiber with reducing light bias for lighting of claim 1, wherein:
    the cyclic phosphite has a molecular weight of 650 or less.

6. The optical fiber with reducing light bias for lighting of claim 1, wherein:
    the cyclic phosphite has a melting point of 220° C. or more.

7. The optical fiber with reducing light bias for lighting of claim 1, wherein:
    the clad includes
    a first clad layer surrounding the core and having a refractive index lower than that of the core; and
    a second clad layer surrounding the first clad layer and having a refractive index lower than that of the first clad layer.

* * * * *